United States Patent

Kawamura

Patent Number: 5,262,897
Date of Patent: Nov. 16, 1993

[54] ZOOM LENS SYSTEM
[75] Inventor: Kazuteru Kawamura, Tokyo, Japan
[73] Assignee: Olympus Optical Co., Ltd., Tokyo, Japan
[21] Appl. No.: 806,335
[22] Filed: Dec. 13, 1991
[51] Int. Cl.⁵ .................. G02B 15/14; G02B 13/18
[52] U.S. Cl. ..................................... 359/689; 359/708
[58] Field of Search ............................... 359/689, 708

[56] References Cited

U.S. PATENT DOCUMENTS

| | | | |
|---|---|---|---|
| 4,465,343 | 8/1984 | Horimoto | 359/689 |
| 4,733,952 | 3/1988 | Fujioka | 359/689 |
| 4,810,072 | 3/1989 | Takahashi | 359/689 |
| 4,824,223 | 4/1989 | Doctor et al. | 359/689 |
| 4,838,666 | 6/1989 | Shiraishi | 359/689 |
| 4,838,668 | 6/1989 | Betensky et al. | 359/689 |
| 5,015,077 | 5/1991 | Ueda | 359/689 X |

FOREIGN PATENT DOCUMENTS 56-158316 12/1981 Japan.
61-221719 10/1986 Japan.
2118509 5/1990 Japan.

Primary Examiner—Scott J. Sugarman
Attorney, Agent, or Firm—Cushman, Darby & Cushman

[57] ABSTRACT

This invention relates to a zoom lens system that is an object lens for taking images which is independent of an objective lens for a viewfinder, said zoom lens system being less likely to vary in the total length by zooming in spite of having a high zoom ratio and being reduced in the total length under every condition from the wide angle to telephoto settings. To achieve this, the present zoom lens system is made up of a first lens unit having a negative refractive power, a second lens unit having a positive refractive power and a third lens unit having a positive refractive power. In zooming from the wide angle to telephoto end the spaces between the respective lens units are variable, and the present lens system satisfies the following condition:

$$f_B < h \tag{1}$$

where $f_B$ is the back focus of the total system and h is the maximum image height of an image to be taken.

7 Claims, 8 Drawing Sheets

ZOOM LENS SYSTEM

BACKGROUND OF THE INVENTION

This invention relates to an image-taking lens system for a lens shutter type of cameras, etc. in which viewfinder optical systems are provided separately from image-taking lenses and, more particularly, to a compact zoom lens system which has a high zoom ratio and is reduced in the total length.

A lens shutter type of cameras used today are mainly zoom cameras with built-in lenses having high zoom ratios. Among frequently used zoom lenses, there are the following two types:

(1) a two-unit type zoom lens comprising a first lens unit that is positive and a second lens unit that is negative, and (2) a three-unit type zoom lens comprising a first lens unit that is positive, a second lens unit that is positive and a third lens unit that is negative.

Among zoom cameras having high zoom ratio ratios, there are cameras designed to be held in their optical axis direction (just as much binoculars would be held in one hand), which are being increasingly used because of being held stably enough. For these cameras, it is desired to use lenses which are less variable in the total lengths during zooming and can be compactly built in the cameras under every condition from the wide angle to telephoto settings. One typical example of these lenses is:

(3) a three-unit zoom lens comprising a first lens unit that is negative, a second lens unit that is positive and a third lens unit that is negative, as set forth in Japanese Provisional Patent Publication No. 56(1981)-158316 or No. 61(1986)-221791.

The zoom lenses (1) and (2) according to the above prior art may be reduced in the total lengths at the wide angle settings, but are increased in the total lengths at the long focal-length (telephoto) settings. This is particularly true for zoom lenses having a zoom ratio as high as 3 or more; that is, there is an appreciable variation in in the total lengths from the short to long focal-length settings. As a result, the mechanism for extending or retracting lenses telescopically causes the lenses to get out of order, having a nonnegligible influence on lens performance.

Furthermore, since these are all of a telephoto type, the more it is intended to obtain a wide field angle, the more difficult it is to make sure of a back focus.

As already stated, the zoom lenses set forth in Japanese Provisional Patent Publication No. 56-158316 and No. 61-221791 are suitable for application to well-holdable cameras, and do not pose such problems as mentioned above. However, they are so designed exclusively for single-lens reflex cameras that their back foci are very long. However, they are still too long in the total lengths to be applied to a lens shutter type of cameras.

SUMMARY OF THE INVENTION

Having been accomplished in view of the foregoing, this invention seeks to improve on a zoom lens system belonging to the above type (3), thereby providing a solution to the problems associated with the above prior art. In other words, a main object of this invention is to provide a zoom lens system which, in spite of having a high zoom ratio, is much less likely to vary in the total length by zooming, and is much shorter in the total length under every condition from the wide angle to telephoto settings, than achievable conventionally.

According to one aspect of this invention, there is provided a zoom lens system that is an objective lens for taking images which is independent of an objective lens for a viewfinder and is made up of a first lens unit having a negative refractive power, a second lens unit having a positive refractive power and a third lens unit having a positive refractive power, characterized in that in zooming from the wide angle to telephoto end, the spaces between the respective lens units are variable.

According to another aspect of this invention, there is provided a zoom lens system that is an objective lens for taking images which is independent of an objective lens for a viewfinder and is made up of a first lens unit having a negative refractive power, a second lens unit having a positive refractive power and a third lens unit having a positive refractive power, characterized in that in zooming from the wide angle to telephoto end, the spaces between the respective lens units are variable and said objective lens satisfies the following condition:

$$f_B < h \tag{1}$$

where $f_B$ is the back focus of the total system and h is the maximum image height of an image to be taken.

According to the third aspect of this invention, there is provided a zoom lens system that is an objective lens for taking images which is independent of an objective lens for a viewfinder and is made up of a first lens unit having a negative refractive power, a second lens unit having a positive refractive power and a third lens unit having a positive refractive power, characterized in that in zooming from the wide angle to telephoto end, the spaces between the respective lens units are relatively variable with respect to one another such that the first and second lens units are being moved toward each other and the second and third lens units are being moved away from each other and said objective lens satisfies the following condition:

$$f_B < h \tag{1}$$

where $f_B$ is the back focus of the total system and h is the maximum image height of an image to be taken.

In each of the above zoom lens systems, it is desired that in zooming from the wide angle to telephoto end, the first, second and third lens units are each movable along the optical axis, or alternatively the first and second lens units are movable along the optical axis while the third lens unit remains fixed.

Preferably, the above zoom lenses should also conform to the following three conditions:

$$0.3 < |f_2/f_1| < 0.9, \tag{2}$$

$$2.0 < |f_3/f_2| < 8.0, \tag{3}$$

$$0.6 < D_2/f_W < 1.5. \tag{4}$$

Here $f_1$, $f_2$ and $f_3$ are the focal lengths of the first, second and third lens units, respectively; $f_W$ is the focal length of the total system at the wide angle end; and $D_2$ is the distance from the first to final surface of the second lens unit.

More preferably, they should conform additionally to the following condition:

$$0.6 < f_W \times 1/f_A < 2. \tag{5}$$

Here $1/f_A = 1/f_1 + 1/f_2 - d_W/f_1 \cdot f_2$ and $d_W$ is the space between the principal points of the first and second lens units at the wide angle end.

It is noted that the second lens unit should preferably be of a telephoto type made up of a front subunit having a positive refractive power and a rear subunit having a negative refractive power.

In particular, the present zoom lens systems constructed as above are used as the image-taking lens systems for a lens shutter type of cameras, etc. in which the viewfinder optical systems are provided separately from the image-taking lenses.

It is understood that during zooming from the wide angle to telephoto end, the first lens unit should preferably be moved such that it is farthest away from the object point at a focal length lying intermediate between the wide angle and telephoto ends.

In what follows, the conditions applied to this invention will be explained.

Condition (1) gives a definition to the back focus of the total system. Above the upper limit of this condition (1), the back focus becomes too long to reduce the size of the lens system, because the distance from the film plane to the front surface of the lens system becomes long.

Both Conditions (2) and (3) concern the total length and performance of the lens system.

Below the lower limit of Condition (2), it is difficult to prevent distortion from occurring at the wide angle setting. Besides, the total length of the lens system becomes too long to make it compact. Exceeding the upper limit is unpreferred, in part because the effective lens diameter of the first lens unit becomes too large to render the lens system compact and in part because the power of the second lens unit is so increased that the occurrence of spherical aberration at the telephoto setting in particular becomes noticeable.

Falling short of the lower limit of Condition (3) is unpreferred; that is, although an increased zooming action is obtained between the second and third lens units and so is favorable for reducing the size of the lens system, the share of the third lens unit to bear the power is so increased that grave distortion occurs. Above the upper limit, the zooming action obtained between the second and third lens units is limited with the result that no reduction in the total length of the lens system is achievable.

Furthermore, the second lens unit is constructed in the form of a telephoto type unit, which enables the back focus of the lens system to be reduced, while allowing of a sufficient space between the first and second lens units, at the wide angle end, thereby reducing the total length of the lens system. At the telephoto end, on the other hand, a high zoom ratio can be achieved while reducing the total length of the lens system, because not only is the second lens unit of a telephoto type but a sufficient space has also been kept between the first and second lens units at the wide angle end.

Condition (4) is provided so as to make the above telephoto type's action effective. Below the lower limit, it is impossible to correct aberrations well, because to make the second lens unit telephoto accounts for an increase in both the powers of the positive and negative lens elements. Above the upper limit, the constructional length of the second lens unit is too long to attain the object of this invention—the reduction in the total length of the lens system.

Furthermore, it is desired that the present zoom lens systems meet the following condition:

$$0.6 < f_W \times 1/f_A < 2. \tag{5}$$

Here $1/f_A = 1/f_1 + 1/f_2 - d_W/f_1 \cdot 2$, provided that $d_W$ is the space between the principal points of the first and second lens units at the wide angle end.

Generally speaking, this gives a definition to the zooming capacity from the wide angle to telephoto end and the stability of aberrations. Falling short of the lower limit is unpreferred; that is, to obtain a high zoom ratio of 3 or more gives rise to too large an increase in the power of the first or third lens unit, resulting chiefly in grave distortion. When the upper limit is exceeded, there is an increase in the zooming capacity, but the effect on making the second lens unit telephoto is so impermissibly increased that serious aberrations occur in the second lens unit.

By using the above arrangements and conditions, it is possible to achieve a zoom lens system which has a high zoom ratio but, nonetheless, is less likely to vary in the total length by zooming and reduced in size under every condition from the wide angle to telephoto settings.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

This invention will now be explained specifically but not exclusively with reference to the accompanying drawings, in which.

DESCRIPTION OF THE PREFERRED EMBODIMENTS

Figure 1:
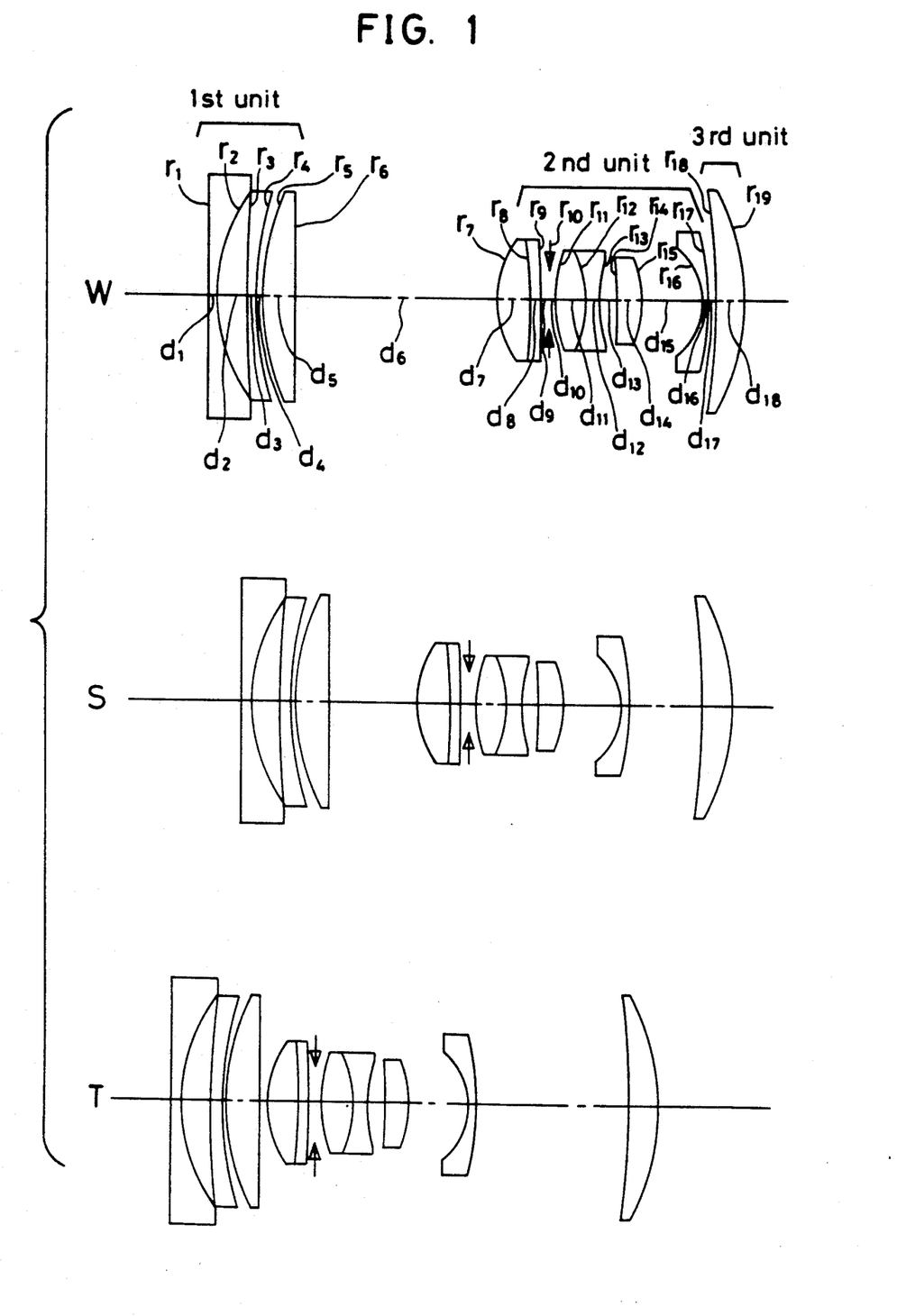
FIG. 1 is sectional views of the lens system according to Example 1 at the wide angle (W), standard (S) and telephoto (T) settings.
Figure 2:
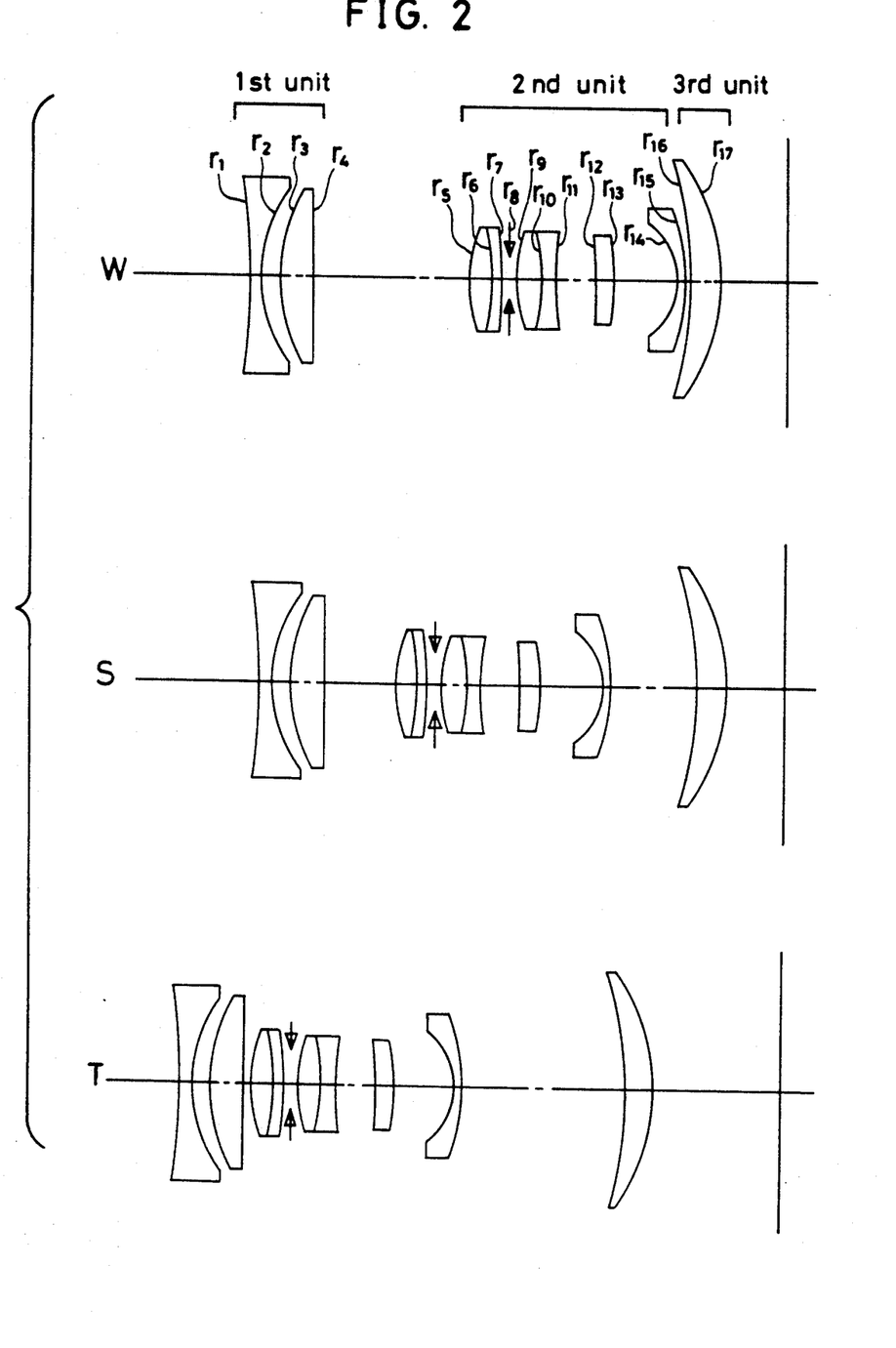
FIGS. 2 and 3 are sectional views, similar to FIG. 1, of the lens systems according to Examples 4 and 5, respectively.
Figure 3:
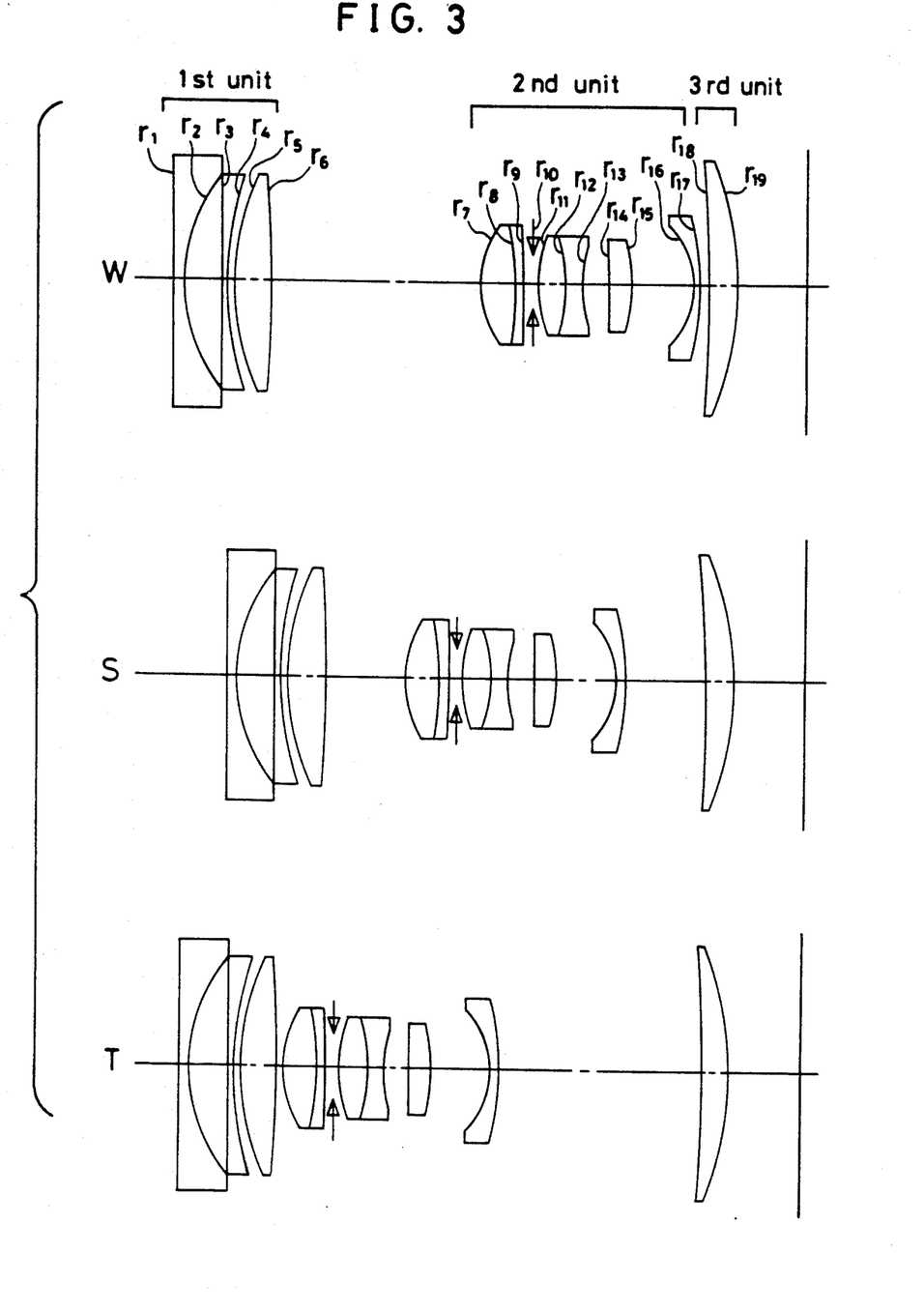

In what follows, the zoom lens systems of this invention will be explained with reference to Examples 1–5, the numerical data of which will be given later. The sections of the lens systems according to Examples 1, 4 and 5 at the wide angle (W), standard (S) and telephoto (T) settings are shown in FIGS. 1, 2 and 3. The aberration curves of these examples at the wide angle (W), standard (S) and telephoto (T) settings are also illustrated in FIGS. 4 to 8.

Set out below are the numerical data wherein various symbols, except those already referred to, have the following meanings:

f . . . the focal length of the total system
$F_{NO}$ . . . the F-number
$2\omega$ . . . half-field angle
$f_B$ . . . the back focus when the object distance is infinite $r_1, r_2, \ldots$ the radii of curvature of the respective lens surfaces
$d_1, d_2, \ldots$ the space between adjacent lens surfaces
$n_{d1}, n_{d2}, \ldots$ the refractive indices of the respective lenses with respect to d-lines
$\nu_{d1}, \nu_{d2}, \ldots$ the Abbe's numbers of the respective lenses
If f and y denote the optical axis direction and the direction normal to the optical axis, respectively, then the aspherical surface has the following formula:

$$x=(y^2/r)/[1+\{1-P(y^2/r^2)\}^{\frac{1}{2}}]+A_4y^4+A_6y^6+A_8y^8.$$

Here r is the paraxial radius of curvature, P is the conical coefficient, and $A_4$, $A_6$ and $A_8$ are the aspherical coeffcients.

Example 1

$f = 28.7 \sim 48.5 \sim 82.0$
$F_{NO} = 3.5 \sim 4.7 \sim 6.5$
$2\omega = 73.9 \sim 48.0 \sim 29.5°$
$f_B = 11.2 \sim 13.0 \sim 23.7$

| | | | |
|---|---|---|---|
| $r_1 = \infty$ | $d_1 = 1.8040$ | $n_{d1} = 1.80610$ | $\nu_{d1} = 40.95$ |
| $r_2 = 25.5777$ | $d_2 = 4.4414$ | | |
| $r_3 = 184.0974$ | $d_3 = 1.4158$ | $n_{d2} = 1.80440$ | $\nu_{d2} = 39.58$ |
| $r_4 = 46.6172$ | $d_4 = 0.9004$ | | |
| $r_5 = 31.9792$ | $d_5 = 5.2236$ | $n_{d3} = 1.72151$ | $\nu_{d3} = 29.24$ |
| $r_6 = -3630.6200$ | $d_6 = $ (Variable) | | |
| $r_7 = 15.7299$ | $d_7 = 5.0000$ | $n_{d4} = 1.60729$ | $\nu_{d4} = 59.38$ |
| $r_8 = -58.0640$ | $d_8 = 1.5000$ | $n_{d5} = 1.80518$ | $\nu_{d5} = 25.43$ |
| $r_9 = -168.6544$ | $d_9 = 1.0000$ | | |
| $r_{10} = \infty$ (Stop) | $d_{10} = 1.0000$ | | |
| $r_{11} = 19.2104$ (Aspheric) | $d_{11} = 4.8169$ | $n_{d6} = 1.51633$ | $\nu_{d6} = 64.15$ |
| $r_{12} = -15.8262$ | $d_{12} = 2.0000$ | $n_{d7} = 1.80610$ | $\nu_{d7} = 40.95$ |
| $r_{13} = 19.1937$ | $d_{13} = 2.5630$ | | |
| $r_{14} = -232.2091$ | $d_{14} = 3.7000$ | $n_{d8} = 1.59551$ | $\nu_{d8} = 39.21$ |
| $r_{15} = -17.5731$ | $d_{15} = 9.0117$ | | |
| $r_{16} = -11.1640$ | $d_{16} = 1.0000$ | $n_{d9} = 1.74100$ | $\nu_{d9} = 52.68$ |
| $r_{17} = -48.9742$ | $d_{17} = $ (Variable) | | |
| $r_{18} = -154.1875$ | $d_{18} = 4.5761$ | $n_{d10} = 1.57250$ | $\nu_{d10} = 57.76$ |
| $r_{19} = -34.1504$ | | | |

| Zooming Spaces | | | |
|---|---|---|---|
| f | 28.7 | 48.5 | 82.0 |
| $d_6$ | 30.614 | 13.169 | 1.153 |
| $d_{17}$ | 0.998 | 10.977 | 23.005 |

| Aspherical Coefficients |
|---|
| 11th surface |
| P = 1 |
| $A_4 = -0.34707 \times 10^{-4}$ |
| $A_6 = -0.15360 \times 10^{-6}$ |
| $A_8 = -0.77535 \times 10^{-9}$ |
| $|f_2/f_1| = 0.5$ |
| $f_3/f_2 = 2.9$ |
| $D_2/f_W = 1.1$ |
| $f_W \times 1/f_A = 1.2$ |

Example 2

$f = 29.0 \sim 54.0 \sim 102.5$
$F_{NO} = 3.5 \sim 4.8 \sim 6.5$
$2\omega = 73.4 \sim 43.6 \sim 23.8°$
$f_B = 10.0 \sim 12.1 \sim 18.1$

| | | | |
|---|---|---|---|
| $r_1 = 148.6230$ | $d_1 = 1.8040$ | $n_{d1} = 1.83400$ | $\nu_{d1} = 37.16$ |
| $r_2 = 31.2862$ | $d_2 = 6.0002$ | | |
| $r_3 = 92.9381$ | $d_3 = 1.6164$ | $n_{d2} = 1.83400$ | $\nu_{d2} = 37.16$ |
| $r_4 = 43.1627$ | $d_4 = 3.0005$ | | |
| $r_5 = 37.7577$ | $d_5 = 5.3597$ | $n_{d3} = 1.84666$ | $\nu_{d3} = 23.78$ |
| $r_6 = 102.2288$ | $d_6 = $ (Variable) | | |
| $r_7 = 19.9071$ | $d_7 = 5.5011$ | $n_{d4} = 1.56883$ | $\nu_{d4} = 56.34$ |
| $r_8 = -65.0904$ | $d_8 = 1.8000$ | $n_{d5} = 1.84666$ | $\nu_{d5} = 23.78$ |
| $r_9 = -110.2040$ | $d_9 = 1.0000$ | | |
| $r_{10} = \infty$ (Stop) | $d_{10} = 1.0000$ | | |
| $r_{11} = 20.9198$ (Aspheric) | $d_{11} = 5.5979$ | $n_{d6} = 1.49782$ | $\nu_{d6} = 66.83$ |
| $r_{12} = -23.0099$ | $d_{12} = 1.5000$ | $n_{d7} = 1.83400$ | $\nu_{d7} = 37.16$ |
| $r_{13} = 31.7353$ | $d_{13} = 7.0874$ | | |
| $r_{14} = -611.9823$ | $d_{14} = 3.0862$ | $n_{d8} = 1.59270$ | $\nu_{d8} = 35.29$ |
| $r_{15} = -26.8949$ | $d_{15} = 9.3831$ | | |
| $r_{16} = -11.7850$ | $d_{16} = 1.0000$ | $n_{d9} = 1.78590$ | $\nu_{d9} = 44.18$ |
| $r_{17} = -37.0224$ | $d_{17} = $ (Variable) | | |
| $r_{18} = -1221.4696$ | $d_{18} = 6.0000$ | $n_{d10} = 1.63636$ | $\nu_{d10} = 35.37$ |
| $r_{19} = -56.4546$ | | | |

| Zooming Spaces | | | |
|---|---|---|---|
| f | 29.0 | 54.0 | 102.5 |
| $d_6$ | 48.115 | 18.076 | 1.066 |
| $d_{17}$ | 1.731 | 13.503 | 36.735 |

| Aspherical Coefficients |
|---|
| 11th surface |
| P = 1 |
| $A_4 = -0.76581 \times 10^{-5}$ |
| $A_6 = -0.28641 \times 10^{-7}$ |
| $A_8 = -0.51017 \times 10^{-10}$ |
| $|f_2/f_1| = 0.5$ |
| $f_3/f_2 = 2.9$ |
| $D_2/f_W = 1.3$ |
| $f_W \times 1/f_A = 1.2$ |

Example 3

$f = 29.1 \sim 54.0 \sim 102.5$
$F_{NO} = 3.5 \sim 4.8 \sim 6.5$
$2\omega = 73.2 \sim 43.6 \sim 23.8°$
$f_B = 9.0 \sim 10.1 \sim 15.2$

| | | | |
|---|---|---|---|
| $r_1 = 148.1478$ | $d_1 = 1.8040$ | $n_{d1} = 1.83400$ | $\nu_{d1} = 37.16$ |
| $r_2 = 32.5257$ | $d_2 = 6.0005$ | | |
| $r_3 = 100.2553$ | $d_3 = 1.6164$ | $n_{d2} = 1.83400$ | $\nu_{d2} = 37.16$ |
| $r_4 = 39.7545$ | $d_4 = 3.0004$ | | |
| $r_5 = 37.5499$ | $d_5 = 6.0005$ | $n_{d3} = 1.84666$ | $\nu_{d3} = 23.78$ |
| $r_6 = 123.3795$ | $d_6 = $ (Variable) | | |
| $r_7 = 21.6039$ | $d_7 = 5.5009$ | $n_{d4} = 1.56883$ | $\nu_{d4} = 56.34$ |
| $r_8 = -49.6040$ | $d_8 = 1.8000$ | $n_{d5} = 1.84666$ | $\nu_{d5} = 23.78$ |
| $r_9 = -95.0738$ | $d_9 = 1.0000$ | | |
| $r_{10} = \infty$ (Stop) | $d_{10} = 1.0000$ | | |
| $r_{11} = 25.8921$ (Aspheric) | $d_{11} = 5.7859$ | $n_{d6} = 1.49782$ | $\nu_{d6} = 66.83$ |
| $r_{12} = -30.7152$ | $d_{12} = 1.5000$ | $n_{d7} = 1.83400$ | $\nu_{d7} = 37.16$ |
| $r_{13} = 42.6611$ | $d_{13} = 8.1819$ | | |
| $r_{14} = 458.1502$ | $d_{14} = 5.4035$ | $n_{d8} = 1.59270$ | $\nu_{d8} = 35.29$ |
| $r_{15} = -34.0660$ | $d_{15} = 9.8173$ | | |
| $r_{16} = -12.8529$ | $d_{16} = 1.0000$ | $n_{d9} = 1.78590$ | $\nu_{d9} = 44.18$ |
| $r_{17} = -45.3334$ | $d_{17} = $ (Variable) | | |
| $r_{18} = 4337.1321$ | $d_{18} = 6.0000$ | $n_{d10} = 1.63636$ | $\nu_{d10} = 35.37$ |
| $r_{19} = -61.5087$ | | | |

| Zooming Spaces | | | |
|---|---|---|---|
| f | 29.1 | 54.0 | 102.5 |
| $d_6$ | 49.997 | 18.864 | 1.098 |
| $d_{17}$ | 1.741 | 14.072 | 37.159 |

| Aspherical Coefficients |
|---|
| 11th surface |
| P = 1 |
| $A_4 = -0.92778 \times 10^{-5}$ |
| $A_6 = -0.26616 \times 10^{-7}$ |
| $A_8 = -0.19373 \times 10^{-9}$ |
| $|f_2/f_1| = 0.5$ |
| $f_3/f_2 = 3.0$ |
| $D_2/f_W = 1.4$ |
| $f_W \times 1/f_A = 1.2$ |

Example 4

$f = 28.7 \sim 48.5 \sim 82.0$
$F_{NO} = 4.5 \sim 5.7 \sim 7.2$
$2\omega = 73.9 \sim 48.0 \sim 29.5°$
$f_B = 10.3 \sim 8.9 \sim 19.5$

| | | | |
|---|---|---|---|
| $r_1 = -118.4316$ | $d_1 = 1.8040$ | $n_{d1} = 1.83481$ | $\nu_{d1} = 42.72$ |
| $r_2 = 19.1453$ | $d_2 = 3.0130$ | | |
| $r_3 = 29.9051$ (Aspheric) | $d_3 = 5.0000$ | $n_{d2} = 1.72825$ | $\nu_{d2} = 28.46$ |
| $r_4 = -1886.6195$ | $d_4 = $ (Variable) | | |
| $r_5 = 19.1711$ | $d_5 = 3.5000$ | $n_{d3} = 1.58313$ | $\nu_{d3} = 59.36$ |
| $r_6 = -29.3131$ | $d_6 = 1.5000$ | $n_{d4} = 1.80518$ | $\nu_{d4} = 25.43$ |
| $r_7 = -69.6547$ | $d_7 = 1.0000$ | | |
| $r_8 = \infty$ (Stop) | $d_8 = 1.0000$ | | |
| $r_9 = 17.4853$ | $d_9 = 4.0360$ | $n_{d5} = 1.49831$ | $\nu_{d5} = 65.03$ |
| $r_{10} = -24.6204$ | $d_{10} = 2.0191$ | $n_{d6} = 1.83481$ | $\nu_{d6} = 42.72$ |
| $r_{11} = 44.0568$ | $d_{11} = 5.8025$ | | |
| $r_{12} = -268.2378$ | $d_{12} = 3.0000$ | $n_{d7} = 1.59270$ | $\nu_{d7} = 35.29$ |
| $r_{13} = -32.4737$ | $d_{13} = 9.5589$ | | |

-continued

| (Aspheric) | | | |
|---|---|---|---|
| $r_{14} = -9.7335$ | $d_{14} = 1.0000$ | $n_{d8} = 1.72916$ | $v_{d8} = 54.68$ |
| $r_{15} = -29.4775$ | $d_{15} =$ (Variable) | | |
| $r_{16} = -65.3015$ | $d_{16} = 4.5000$ | $n_{d9} = 1.62280$ | $v_{d9} = 57.06$ |
| $r_{17} = -30.1780$ | | | |

| Zooming Spaces | | | |
|---|---|---|---|
| f | 28.7 | 48.5 | 82.0 |
| $d_4$ | 23.563 | 10.515 | 1.000 |
| $d_{15}$ | 0.920 | 12.861 | 23.988 |

Aspherical Coefficients

3ed surface
P = 1
$A_4 = 0.10635 \times 10^{-4}$
$A_6 = 0.23273 \times 10^{-7}$
$A_8 = 0.47073 \times 10^{-10}$
13th surface
P = 1
$A_4 = 0.21333 \times 10^{-4}$
$A_6 = 0.72304 \times 10^{-8}$
$A_8 = -0.24293 \times 10^{-11}$
$|f_2/f_1| = 0.5$
$f_3/f_2 = 3.8$
$D_2/f_W = 1.1$
$f_W \times 1/f_A = 1.3$ Example 5

$f = 28.7 \sim 48.5 \sim 82.0$
$F_{NO} = 3.5 \sim 4.7 \sim 6.5$
$2\omega = 73.9 \sim 48.0 \sim 29.5°$
$f_B = 10.7 \sim 10.7 \sim 10.7$

| $r_1 = 6650.4217$ | $d_1 = 1.8040$ | $n_{d1} = 1.80610$ | $v_{d1} = 40.95$ |
|---|---|---|---|
| $r_2 = 26.8309$ | $d_2 = 5.3654$ | | |
| $r_3 = 441.3474$ | $d_3 = 1.0000$ | $n_{d2} = 1.80440$ | $v_{d2} = 39.58$ |
| $r_4 = 51.6545$ | $d_4 = 0.8909$ | | |
| $r_5 = 34.8202$ | $d_5 = 5.9939$ | $n_{d3} = 1.72151$ | $v_{d3} = 29.24$ |
| $r_6 = -294.1355$ | $d_6 =$ (Variable) | | |
| $r_7 = 17.2303$ | $d_7 = 5.0000$ | $n_{d4} = 1.60729$ | $v_{d4} = 59.38$ |
| $r_8 = -46.7341$ | $d_8 = 1.5000$ | $n_{d5} = 1.80518$ | $v_{d5} = 25.43$ |
| $r_9 = -121.5260$ | $d_9 = 1.0000$ | | |
| $r_{10} = \infty$ (Stop) | $d_{10} = 1.0000$ | | |
| $r_{11} = 19.3413$ (Aspheric) | $d_{11} = 4.9489$ | $n_{d6} = 1.51112$ | $v_{d6} = 60.48$ |
| $r_{12} = -19.0795$ | $d_{12} = 2.0000$ | $n_{d7} = 1.80610$ | $v_{d7} = 40.95$ |
| $r_{13} = 20.5905$ | $d_{13} = 4.1317$ | | |
| $r_{14} = -743.1396$ | $d_{14} = 3.7000$ | $n_{d8} = 1.59551$ | $v_{d8} = 39.21$ |
| $r_{15} = -22.2865$ | $d_{15} = 9.3684$ | | |
| $r_{16} = -11.4041$ | $d_{16} = 1.0000$ | $n_{d9} = 1.74100$ | $v_{d9} = 52.68$ |
| $r_{17} = -35.7289$ | $d_{17} =$ (Variable) | | |
| $r_{18} = -369.0335$ | $d_{18} = 4.7523$ | $n_{d10} = 1.57250$ | $v_{d10} = 57.76$ |
| $r_{19} = -48.4368$ | | | |

| Zooming Spaces | | | |
|---|---|---|---|
| f | 28.7 | 48.5 | 82.0 |
| $d_6$ | 33.069 | 12.971 | 1.035 |
| $d_{17}$ | 0.992 | 12.065 | 30.791 |

Aspherical Coefficients

13th surface
P = 1
$A_4 = -0.22356 \times 10^{-4}$
$A_6 = -0.37501 \times 10^{-7}$
$A_8 = -0.89879 \times 10^{-9}$
$|f_2/f_1| = 0.5$
$f_3/f_2 = 3.44$
$D_2/f_W = 1.2$
$f_W \times 1/f_A = 1.1$ As can be best seen from FIG. 1, the first lens unit in Example 1 is made up of two negative lenses and one positive lens and has a negative power. The second lens unit is made up of six lenses in all, i.e., two cemented lenses each consisting of positive and negative lenses, one positive lens and one negative lens, and has a positive power. The third lens unit is constructed by one positive lens. Thus, the zoom lens system according to Example 1 is constructed from eight lens groups in all and made up of ten lenses in all. During zooming from the wide angle to telephoto end, the first lens unit is moved such that it is farthest away from the object point at a focal length lying intermediate between the wide angle and telephoto ends. During zooming from the wide angle to telephoto setting, the second lens unit is moved toward the object point. Furthermore, during zooming from the wide angle to telephoto setting, the third lens unit is spaced away from the second lens unit. It is noted that the second lens unit is made telephoto.

According to Example 1, the negative meniscus lens that is the final lens of the second lens unit enables the positive distortions occurring in the first and third lens units to be effectively corrected and the second lens unit to be made telephoto. On- and off-axial aberrations are also well corrected by incorporating at least one aspherical surface into the second lens unit.

Figure 4:
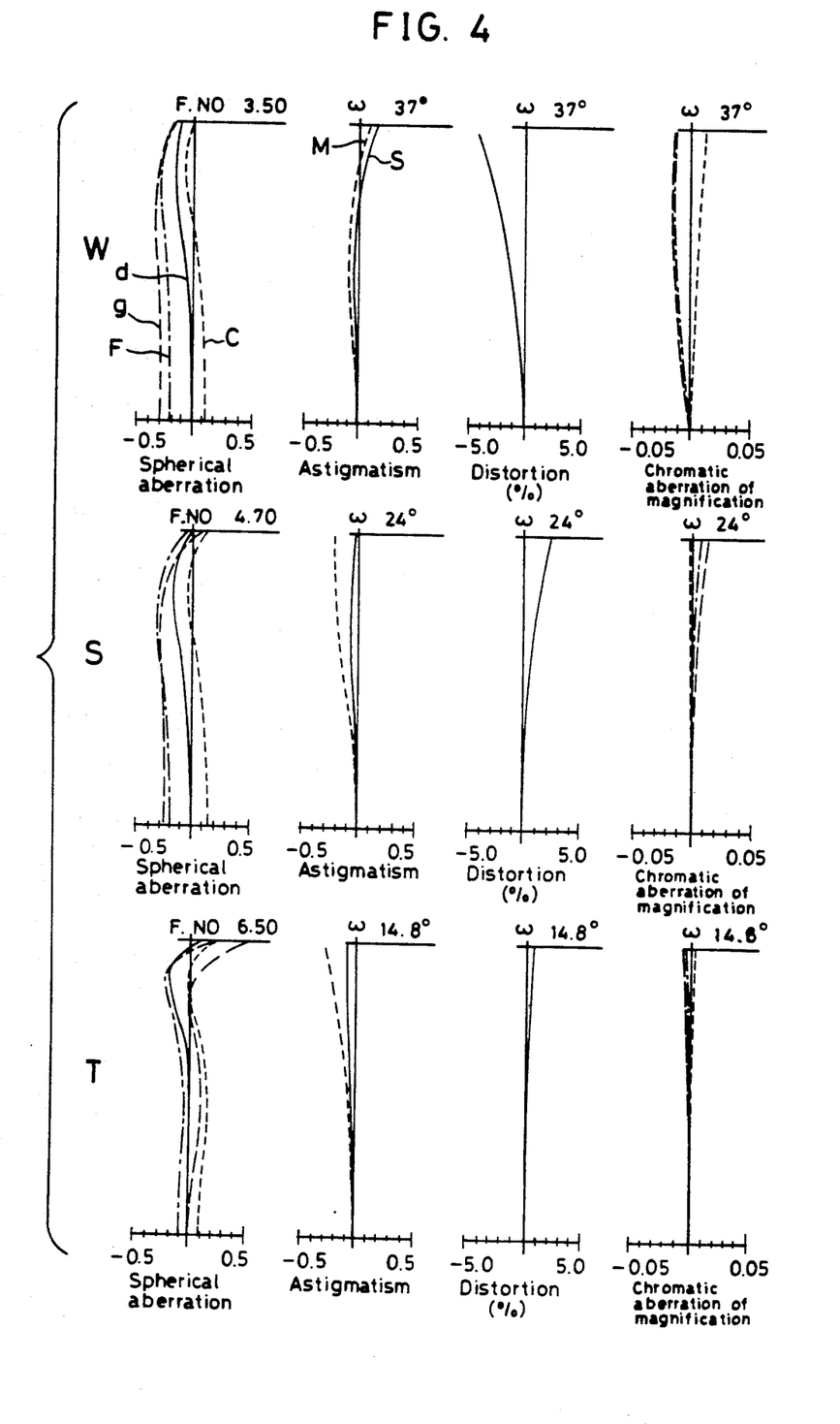
FIGS. 4–8 are aberration curve diagrams of Examples 1–5 at the wide angle (W), standard (S) and telephoto (T) settings, respectively.

With the above arrangement of the zoom lens system, it is possible to achieve a zoom ratio as high as about 3, while making the total length thereof less likely to vary by zooming and reducing the total length thereof under every condition from the wide angle to telephoto end. NB. The aberration curve diagrams of Example 1 at the wide angle (W), standard (S) and telephoto (T) settings are shown in FIG. 4.

Figure 5:
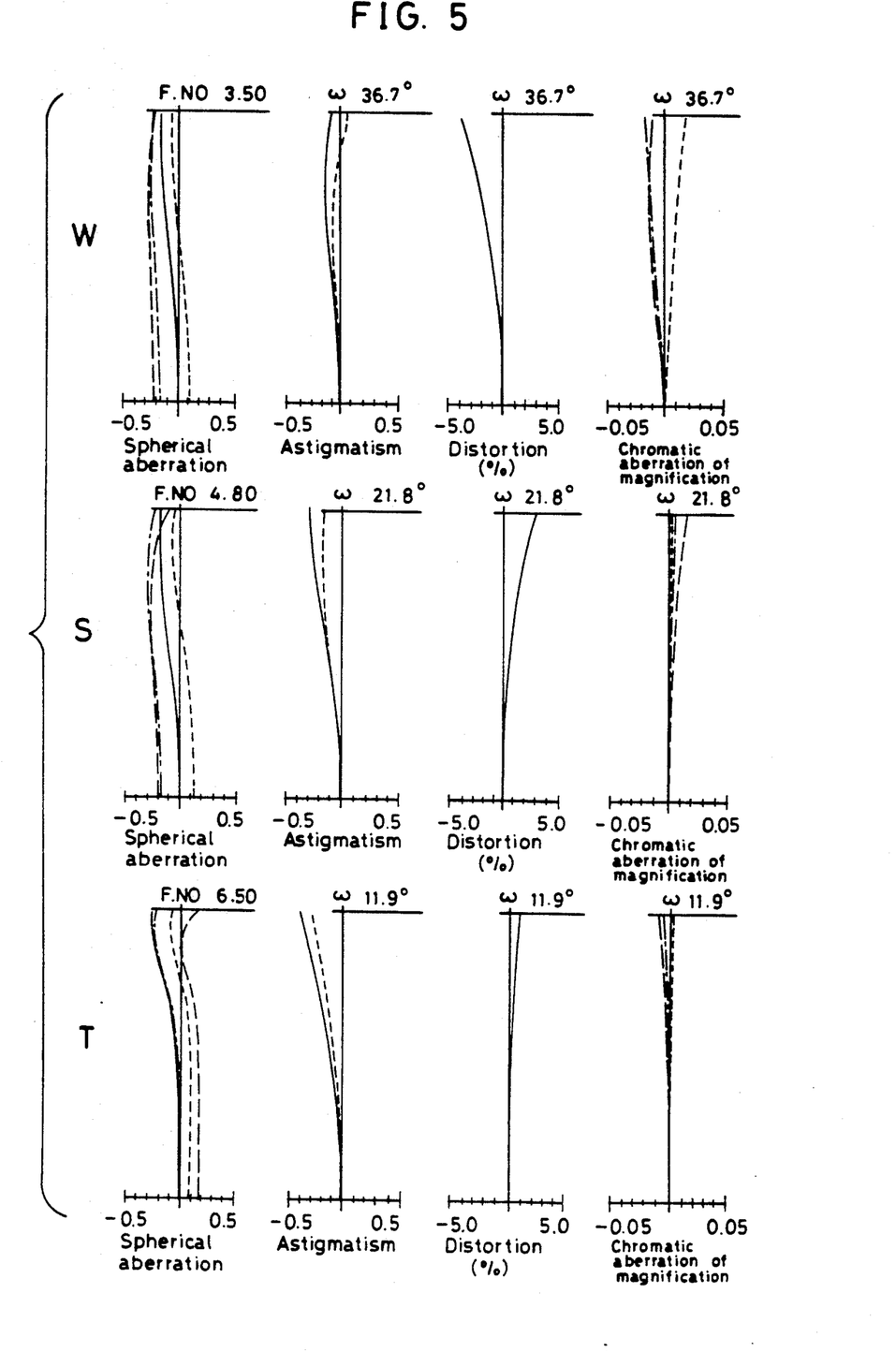
Figure 6:
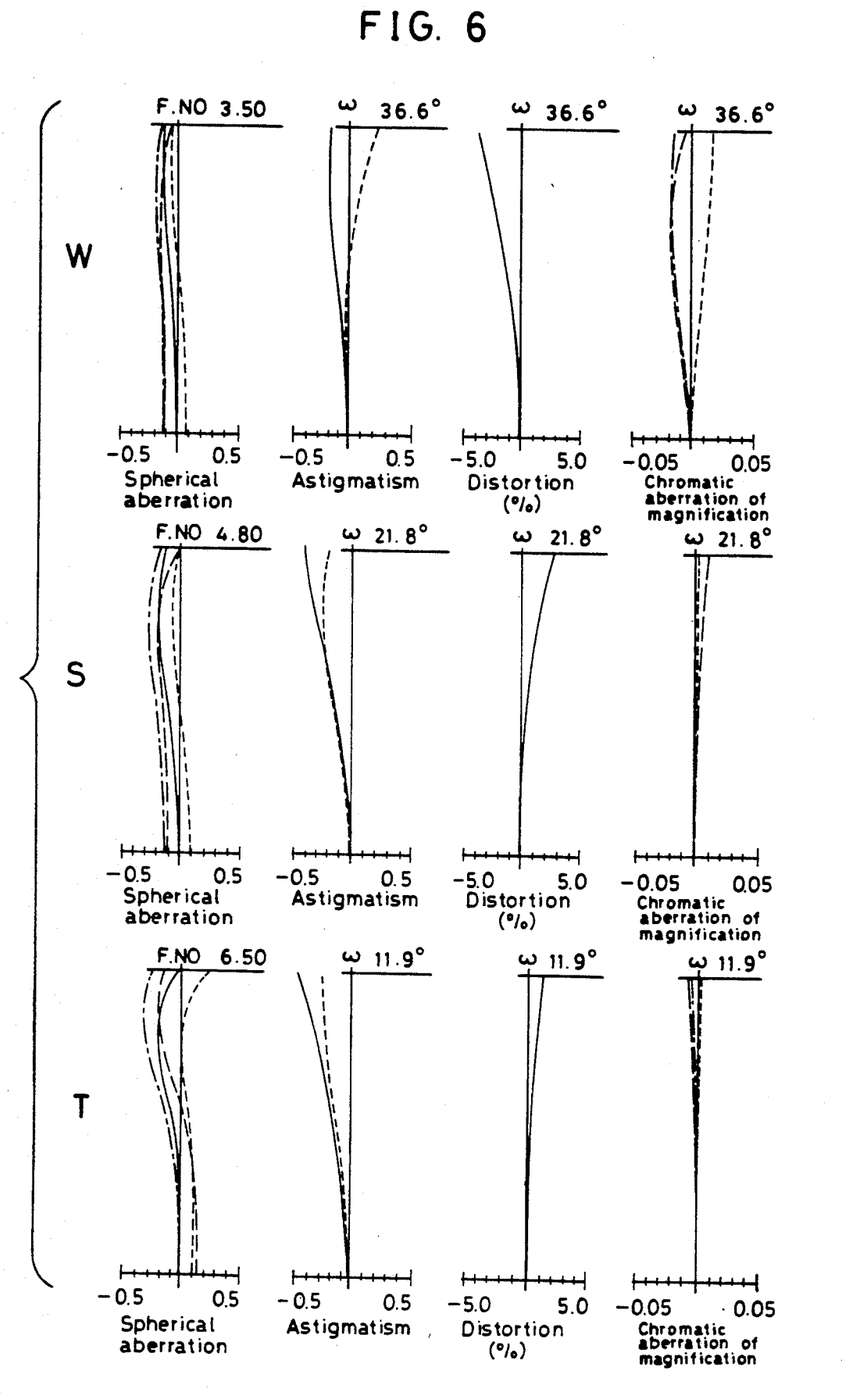

The lens movement and arrangements of the respective lens units according to Examples 2 and 3 are substantially similar to those described in connection with Example 1, but a zoom ratio as high as about 4 is achieved. The aberrations curves of Examples 2 and 3 at the wide angle (W), standard (S) and telephoto (T) settings are shown in FIGS. 5 and 6.

Figure 7:
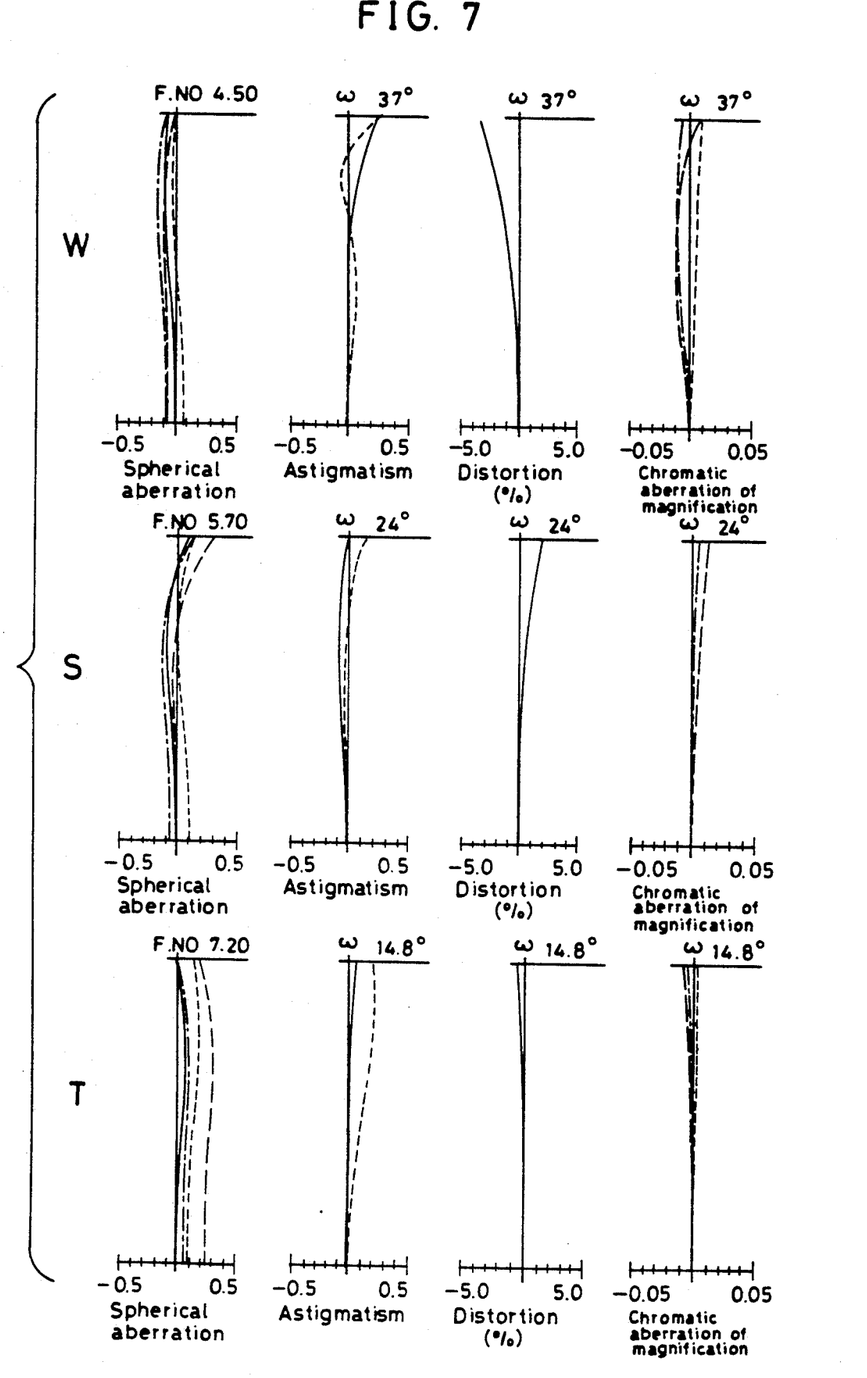

As can be best seen from FIG. 2 showing the sections of the zoom lens system at the wide angle (W), standard (S) and telephoto (T) settings, the movement of the respective lens units of Example 4 and the constructions of the second and third lens units thereof are substantially similar to those described in connection with Example 1, but the first lens unit is made up of two lenses, negative and positive. Thus, the zoom lens system according to Example 4 is constructed from three lens groups in all and made up of 9 lenses in all. By placing an aspherical surface on one surface of the first lens unit, the aberrations are well corrected while reducing the total length of the zoom lens system. The aberration curves of Example 4 at the wide angle (W), standard (S) and telephoto (T) settings are shown in FIG. 7.

Figure 8:
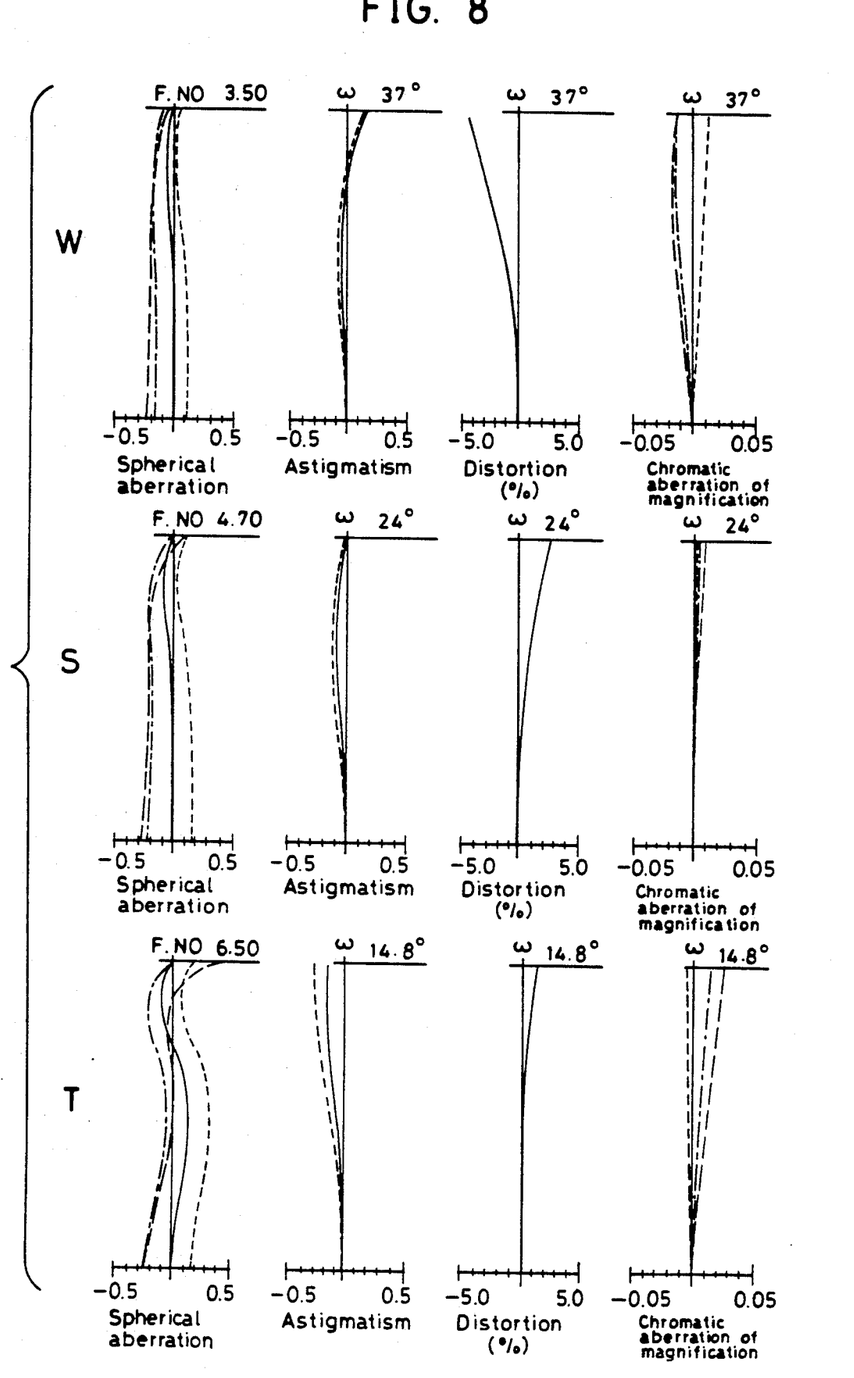

Furthermore, the sections of the zoom lens system according to Example 5 at the wide angle (W), standard (S) and telephoto (T) settings are shown in FIG. 3. The lens makeup and the movement of the first and second lens units are substantially similar to those described in connection with Example 1, but the third lens unit remains fixed during zooming, whereby not only is such an effect as referred to in Example 1 obtained but the lens barrel's makeup is also simplified due to no need of moving the third lens unit. The aberration curves of Example 5 at the wide angle (W), standard (S) and telephoto (T) are shown in FIG. 8.

As explained above, the zoom lens systems according to this invention is less likely to vary in the total lengths by zooming, in spite of having high zoom ratios. Therefore, it is possible to prevent the lenses from getting out of order, which would otherwise take place in association with the extension or retraction of the lenses, as often experienced with zooming at high zoom ratios. Furthermore, the present zoom lens systems, although having high zoom ratios, are reduced in the total lengths under every condition from the wide angle to telephoto settings and have high optical performance. Thus, the present zoom lens systems lend themselves well fit for use with a lens shutter type of cameras in which the viewfinder optical systems are provided separately from the image-taking lenses.

What is claimed is:

1. A zoom lens system that is an objective lens for taking images which is independent of an objective lens for a viewfinder and comprising, in order from the object side, a first lens unit having a negative refractive power, a second lens unit having a positive refractive power disposed on a rear side of said first lens unit and a third lens unit having a positive refractive power disposed on a rear side of said second lens unit, wherein when zooming from a wide angle end to a telephoto end, spaces between respective lens units are variable and said objective lens satisfies the following condition:

$$f_B < h \qquad (1)$$

where $f_B$ is the back focus of the total system and h is the maximum height of an image to be taken.

2. A zoom lens system that is an objective lens for taking images which is independent of an objective lens for a viewfinder and comprising, in order from the object side, a first lens unit having a negative refractive power, a second lens unit having a positive refractive power disposed on a rear side of said first lens unit and a third lens unit having a positive refractive power disposed on the rear side of said second lens unit, wherein when zooming from a wide angle end to a telephoto end, spaces between the lens units are relatively variable with respect to one another such that the first and second lens units are being moved toward each other and the second and third lens units are being moved away from each other and said objective lens system satisfies the following condition:

$$f_B < h \qquad (1)$$

where $f_B$ is the back focus of the total system and h is the maximum height of an image to be taken.

3. A zoom lens system as claimed in claim 1 or 2, wherein when zooming from the wide angle to telephoto end, the first, second and third lens units are each movable along the optical axis.

4. A zoom lens system as claimed in claim 1 or 2, wherein when zooming from the wide angle to telephoto end, the first and second lens units are movable along the optical axis while the third lens unit remains fixed.

5. A zoom lens system as claimed in claim 1 or 2, wherein the second lens unit is of a telephoto type constructed from a front subunit having a positive refractive power and a rear subunit having a negative refractive power.

6. A zoom lens system that is an objective lens for taking images, said zoom lens system being independent of an objective lens for a viewfinder and comprising, in order from the object side, a first lens unit having a negative refractive power, a second lens unit having a positive refractive power disposed on a rear side of said first lens unit and a third lens unit having a positive refractive power disposed on a rear side of said second lens unit, wherein when zooming from a wide angle end to a telephoto end, spaces between respective lens units are variable and said objective lens satisfies the following three conditions:

$$0.3 < |f_2/f_1| < 0.9 \qquad (2)$$

$$2.0 < |f_3/f_2| < 8.0 \qquad (3)$$

$$0.6 < D_2/f_W < 1.5 \qquad (4)$$

wherein $f_1$, $f_2$ and $f_3$ are the focal lengths of the first, second and third lens units, respectively, $f_W$ is the focal length of the total system at the wide angle end and $D_2$ is the distance from a first to a final surface of the second lens unit.

7. A zoom lens system that is an objective lens for taking images, said zoom lens system being independent of an objective lens for a viewfinder and comprising, in order from the object side, a first lens unit having a negative refractive power, a second lens unit having a positive refractive power disposed on a rear side of said first lens unit and a third lens unit having a positive refractive power disposed on a rear side of said second lens unit, wherein when zooming from a wide angle end to a telephoto end, spaces between respective lens units are variable and said objective lens satisfies the following condition:

$$0.6 < f_W \times 1/f_A < 2 \qquad (5)$$

wherein $1/f_A = 1/f_1 + 1/f_2 - d_W/f_1 \cdot f_2$, $f_1$ and $f_2$ are the focal lengths of the first and second lens units, respectively, $d_W$ is the space between principal points of the first and second lens units at the wide angle end, and $f_W$ is the focal length of the total system at the wide angle end.

* * * * *

UNITED STATES PATENT AND TRADEMARK OFFICE
CERTIFICATE OF CORRECTION

PATENT NO. : 5,262,897

DATED : November 16, 1993

INVENTOR(S) : Kazuteru KAWAMURA

It is certified that error appears in the above-identified patent and that said Letters Patent is hereby corrected as shown below:

Please add the following section to the title page of the patent.

-- Foreign Application Priority Data

December 19, 1990 [JP] Japan..............2-403731--.

Signed and Sealed this

Tenth Day of May, 1994

Attest:

BRUCE LEHMAN

*Attesting Officer*     *Commissioner of Patents and Trademarks*